May 3, 1927.

A. F. PIEPER

DENTAL APPARATUS

Filed Sept. 20, 1923

INVENTOR.
Alphonse F. Pieper
BY
his ATTORNEY

May 3, 1927.

A. F. PIEPER

DENTAL APPARATUS

Filed Sept. 20, 1923

INVENTOR.
Alphonse F. Pieper
BY
his ATTORNEY

May 3, 1927.

A. F. PIEPER

DENTAL APPARATUS

Filed Sept. 20, 1923    5 Sheets-Sheet 4

1,626,689

INVENTOR.

BY *Alphonse F. Pieper*

*his* ATTORNEY

Patented May 3, 1927.

1,626,689

UNITED STATES PATENT OFFICE.

ALPHONSE F. PIEPER, OF ROCHESTER, NEW YORK.

DENTAL APPARATUS.

Application filed September 20, 1923. Serial No. 663,892.

This invention relates to dental apparatus and, more particularly, to fountain cuspidor fixtures of the variety adapted to be supported on an apparatus pedestal or dental chair and comprising, for example, a cuspidor bowl, glass holder, saliva ejector and means for supplying water to such parts and discharging it therefrom. One object of the invention is to provide an improved unitary fixture of this character which is simple and compact in construction and arrangement and efficient and economical in operation. Another object is the provision of an apparatus of this nature comprising a cuspidor bowl construction capable of being effectively flushed with a minimum quantity of water, combined with a saliva ejector discharging thereinto in addition to the usual flushing water supply and controlled conjointly with the latter for use alternately in flushing the bowl, thus economizing the water consumption. A further object is to provide such a fixture combining a glass holder having improved water discharging means and also a splash guard located between the glass and cuspidor. Still a further object is the provision of a conveniently detachable and accessible valve head of improved construction for controlling the water supply system.

To these and other ends the invention resides in certain improvements and combinations of parts all as will be hereinafter more fully described, the novel features being pointed out in the claims at the end of the specification.

In the drawings.

Similar reference numerals throughout the several views indicate the same parts.

The present invention is in the nature of an improvement upon the apparatus disclosed in prior Letters Patent No. 1,300,868, granted to O. H. and A. F. Pieper April 15, 1919, for dental cuspidor fixtures, comprising a fixture of the character indicated adapted to be supported, for example, on a dental apparatus pedestal. The present embodiment thus comprises a hollow arm 20 inclined outwardly and upwardly from a pedestal or support and having a vertically projecting open end 21 on which is mounted the cuspidor bowl and also a pivoted arm supporting the glass holder, the valve head for the water supply system and associated parts. Arm 20 preferably forms a discharge or waste conduit for the cuspidor and glass holder and also compactly houses the main water supply line, as more fully appears hereafter.

The end 21 of arm 20 is in the present instance internally threaded and fitted with a portion 22 of a union coupling having the usual complementary portion or nut 23 for threaded engagement with a hub portion 24 on the hollow supporting arm 25 which thus communicates through its hub with the interior of arm 20. Hub 24 is connected by a union coupling 26, generally similar to that described above, with a channeled base ring 27 in the channel of which is cemented, as shown, the discharge end of the cuspidor bowl 28. It is apparent from the above construction that the hollow supporting arm 25 is pivotally mounted on the upper end of the arm 20 into which it discharges and that the cuspidor bowl is rotatably supported on the arm 25 and thus in effect on the arm 20 into which it also discharges through the hub of the arm 25.

Figure 1:
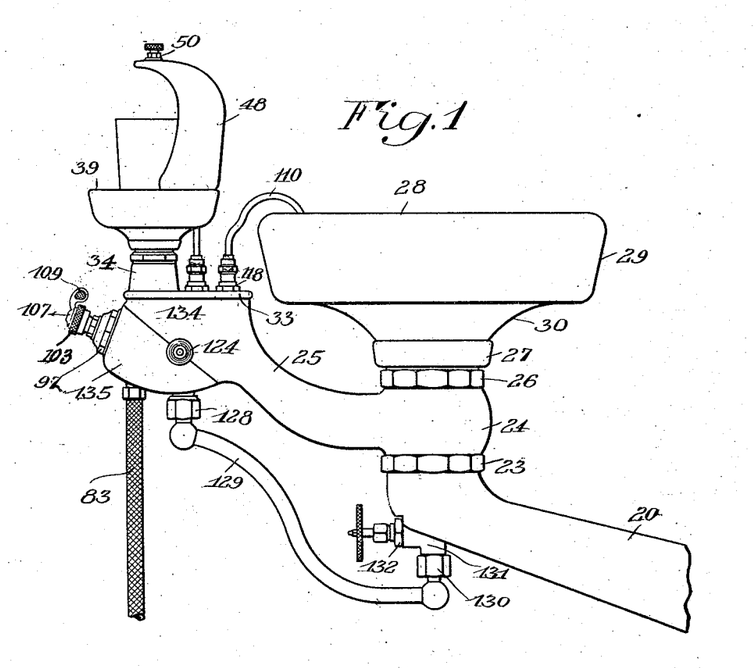
Fig. 1 is a side elevation of a fixture embodying the present invention.
Figure 2:
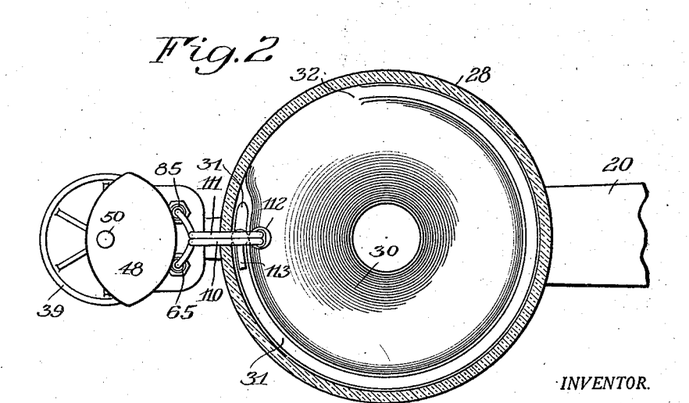
Fig. 2 is a top plan view of the same with the cuspidor bowl in section.
Figures 3, 4:
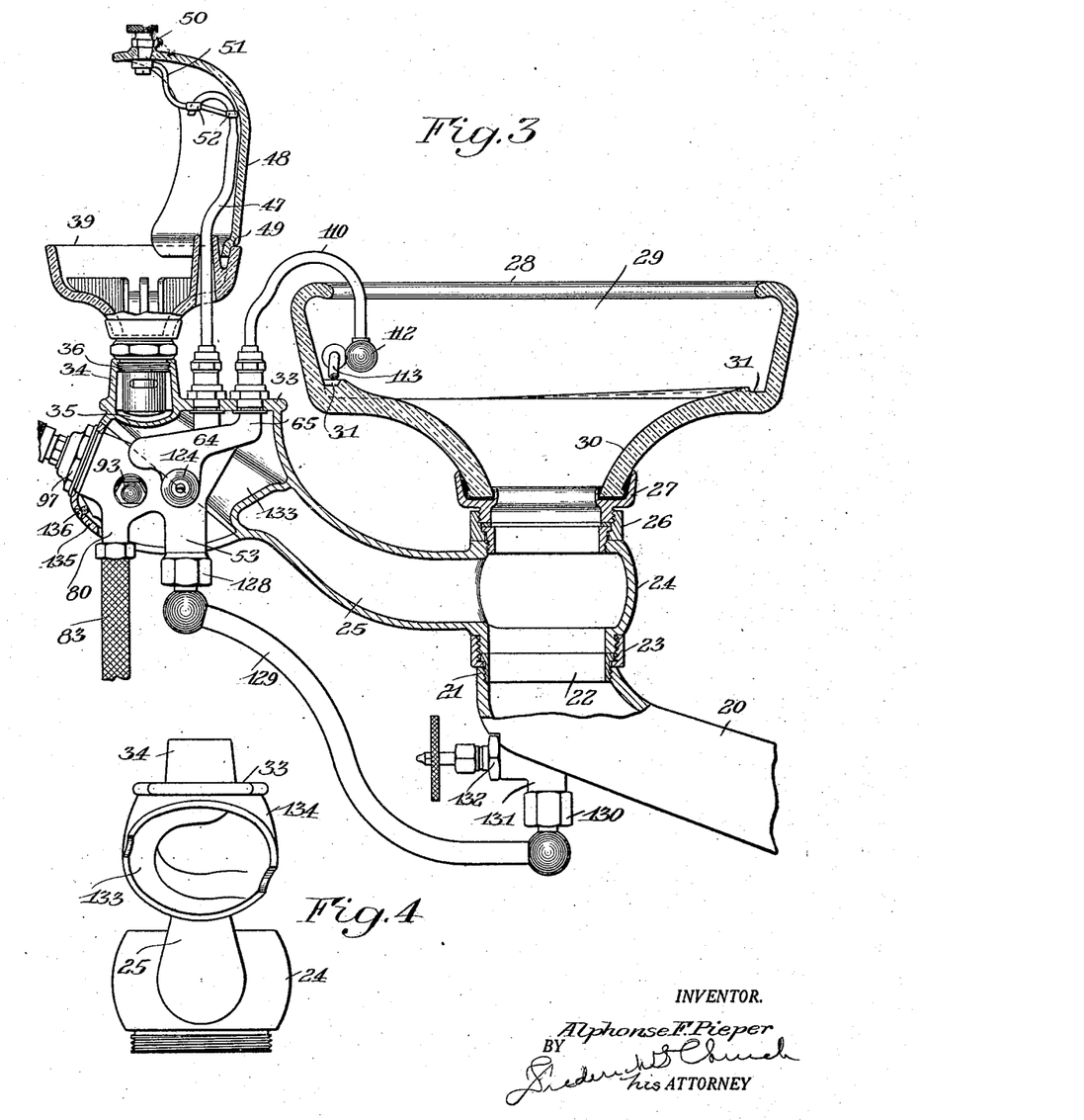
Fig. 3 is an enlarged view similar to Fig. 1 but in central vertical section.
Fig. 4 is an elevation of a supporting arm forming a part of the fixture as viewed from the left in Fig. 1 with the associated parts removed therefrom.

The cuspidor bowl is preferably circular in shape, having side walls 29 and a bottom which is inclined or curved downwardly, as at 30, to a central discharge outlet the rim of which as stated above is mounted on the arm 20. It is to be noted however, that the bowl bottom is formed with a peripherally extending, longitudinally inclined waterway or channel 31, for conducting flushing water from the point of supply around the entire circumference of the bowl. As shown in Figs. 2 and 3, channel 31 is preferably elevated at one end adjacent the water supply means and has at this point a depth sufficient to carry the volume of water required to flush the bowl. The channel is preferably helically inclined downwardly in the direction of its extent and also decreases gradually in depth and terminates as at 32 sufficiently near its starting point to carry the water by gravity, assisted by its velocity, entirely around the bowl. The inclination and depth of the channel are so proportioned that a comparatively small volume of water supplied at a low velocity is conducted by the channel around substantially the entire circumference of the bowl and distributed by lateral overflow of the channel throughout its length to form a continuous film flowing over the curving bottom portion 30 of the bowl into the waste outlet, and the usual trap (not shown) and thus effectively flushing the bowl with a minimum quantity of water. Water is supplied to the bowl through nozzle means at the start of the channel, either from a direct flushing supply or through the saliva ejecting means operating alternately therewith to economize the use of water, as explained hereafter.

The glass holder is carried on the end of arm 25 which is inclined upwardly and outwardly adjacent the periphery of the cuspidor bowl. The arm is formed adjacent its upper end with a horizontal table portion 33 to which is detachably secured, as hereafter described, the valve head for the water supply system. Rising from arm portion 33 is a tubular extension 34 communicating at its lower end with a curved waste conduit 35 forming part of the arm 25. Extension 34 is internally threaded at its upper end to receive a well portion 36 of a waste trap. The upper end of portion 36 is flanged outwardly to form part of a union coupling 37 for detachably securing on the upper end of the well portion 34 a base ring 38 in which is cemented the glass holding bowl 39, as shown. The gasket means 40 between portion 36 and ring 38 is extended inwardly slightly beyond the inner wall of portion 36 and enlarged as at 41 and a discharge spout 42 having a shouldered upper end 43 is detachably seated within and snugly embraced by the gasket which thus not only forms a seal but also detachably supports the discharge spout the lower end of which depends below the liquid level in the well portion 36 of the trap. The spout is provided with a screen 44 and with a guard and handle portion 45 by means of which it may be removed for cleaning. The glass holding bowl is preferably formed with a plurality of webs 46 for supporting the glass in spaced relation with the bottom of the bowl.

The glass holder is supplied with water through an upwardly projecting nozzle or goose neck overhanging the glass for filling the same and the glass holder is provided with a splash guard 48 of the curved shape shown for protecting the glass against expectoration or splashing from the cuspidor. The bottom of the guard is offset inwardly to provide a seat 49 resting on the periphery of the bowl 39 and the upper end of the guard has adjustably secured to its under side, as by means of a clamping bolt and nut means 50, a bracket 51 formed with ring terminals 52 detachably slipped over nozzle 47 for adjustably supporting the guard in position. The latter may conveniently be given a substantial extent circumferentially of the glass holder and curved well over the latter at its top as shown to fully protect the glass.

Figures 5, 6, 7:
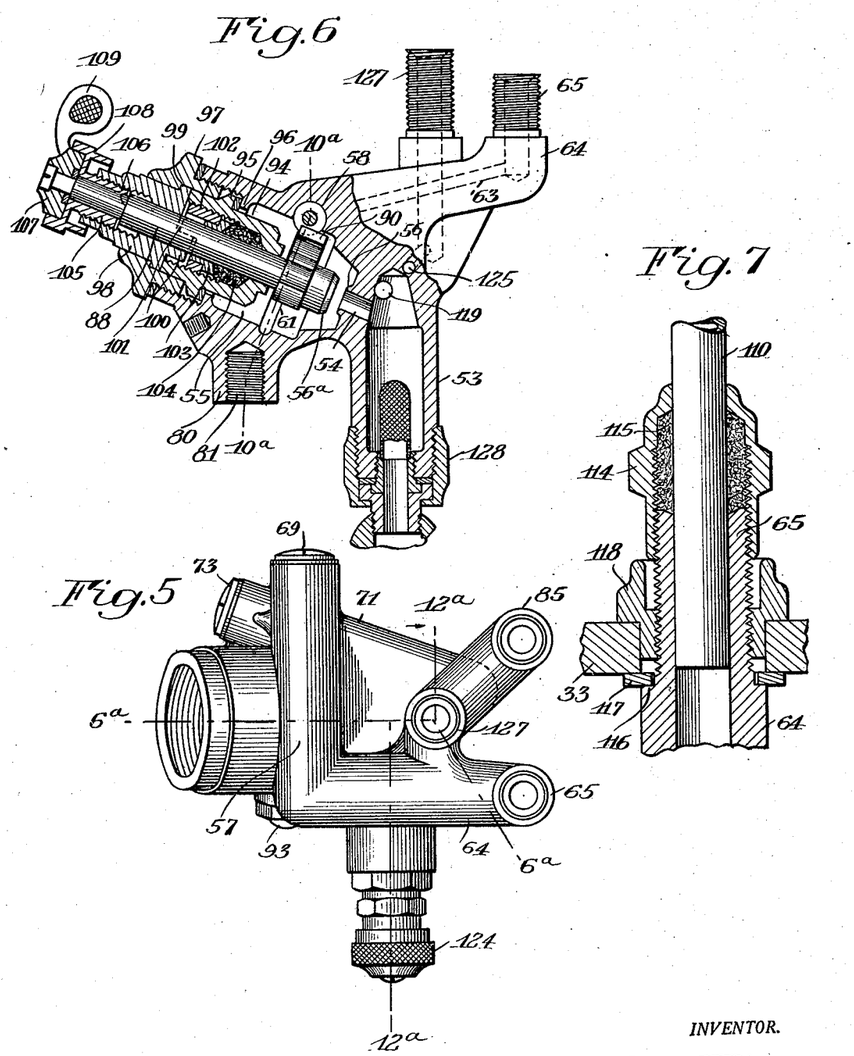
Fig. 5 is an enlarged top plan view of a valve head controlling the water supply system with some of the associated parts removed.
Fig. 6 is a sectional view substantially on the line $6^a$—$6^a$ in Fig. 5.
Fig. 7 is an enlarged central sectional elevation of one of the nozzle extensions of the valve head showing the connection thereof with the support and with the nozzle attachment.
Figure 8:
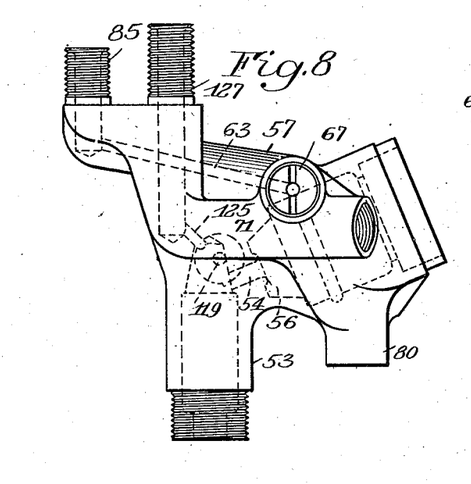
Fig. 8 is an elevation of the valve head on the side opposite that shown in Fig. 6.
Figure 9:
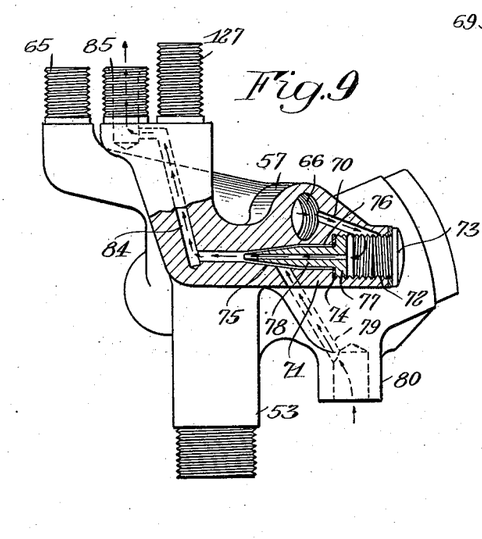
Fig. 9 is a view similar to Fig. 8 but from a more rearward angle and partly in section to show the saliva ejecting means.
Figure 10:
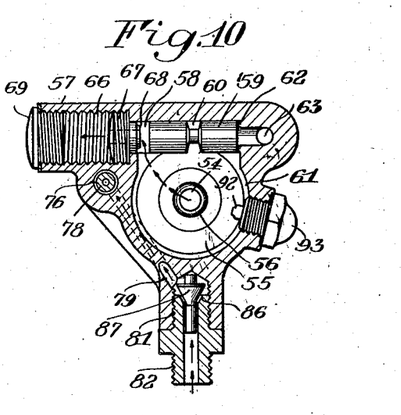
Figs. 10 and 11 are similar sectional views substantially on the line $10^a$—$10^a$ in Fig. 6, but showing the parts in different positions.
Figure 11:
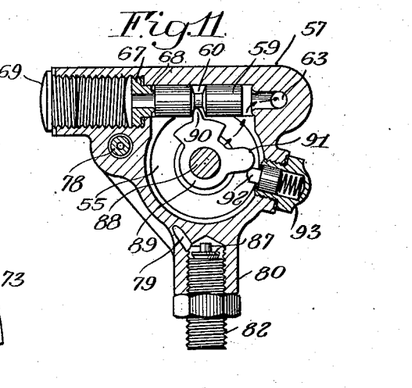

The water supply system for the cuspidor bowl, glass holder and saliva ejecting means is controlled by a single valve head compactly enclosed and detachably mounted within a housing on the arm 25 below the glass holder, as more fully described below, and comprises preferably an integral casting shown in detail in Figs. 5 and 12, inclusive. This casting comprises, in the present instance, an inlet or supply extension 53, Fig. 6 adapted for connection with a suitable source of water under pressure. This connection extends upwardly into the main body of the head and has at 54 a branch passage communicating centrally with the lower end of an inclined chamber 55 formed centrally in the head body. The end of passage 54 is provided in the chamber with a valve seat 56 with which cooperates a valve 56ª to be later described for controlling the supply of water to the chamber. The top of the head is formed with a substantially cylindrical transverse enlargement 57 having therein a bore or cylinder 58, Figs. 6 and 10, in which slides longitudinally a valve body 59 having intermediate its ends a recessed portion 60. Chamber 55 has in its walls an annular enlargement or passage 61 in the plane of bore 60 and cut laterally into the same to provide communication between the chamber and valve bore as shown. Each end of the bore is formed with a valve seat for cooperation with the respective end of the valve body 59, and through one of these seats 62 is a passageway 63 leading through the head and through a nozzle extension 64 having an upwardly projecting threaded end 65. To this connection is attached a nozzle affording a direct supply of water for flushing the cuspidor. The opposite end of valve bore 58 communicates with a threaded enlargement 66, Fig. 10, in which is detachably screwed a plug 67 having an end projecting into bore 58 and provided with a valve seat 68 for cooperation with the other end of valve body 59. The outer end of the bore enlargement 66 is closed by a plug 69 detachable for affording access to the bore. Communicating with the bore enlargement is a passage 70, Fig. 9 leading through the head to saliva ejecting means in the latter which will now be described.

The saliva ejecting means comprises preferably a substantially cylindrical lateral enlargement 71 on the head formed centrally with a bore having an internally threaded end 72 opening externally of the head and with which the supply passage 70 communicates. Bore 72 is closed at its outer end by a detachable plug 73 and its inner portion is shouldered as at 74 and reduced conically to form a throat 75, as shown. A plug 76 has its head 77 screwed into bore 72 against the shoulder 74, the plug having a reduced tapered portion 78 extending through the throat 75 in spaced relation with the sides thereof. Plug 76 has a central passage therethrough for the supply of water from chamber 55 by the means described to the center of the throat. Communicating laterally with the throat is a passage 79 leading from a downward extension 80 internally threaded as at 81 for the reception of a nipple 82 to which is attached a flexible conductor 83 carrying the usual or any suitable terminal for insertion in the patient's mouth for withdrawing the saliva. Bore 75 communicates with a passage 84 leading through an upwardly extending threaded nozzle connection 85 having attached thereto a nozzle means discharging into the cuspidor and serving also to flush the latter. It is apparent that this construction affords an efficient saliva ejection means in the valve head the parts of which may be conveniently reached by removal of plug 73. It is also apparent that by shifting valve body 59 longitudinally against one or the other of its cooperating seats, either the direct water supply or the saliva ejecting means may be brought into operation, thereby flushing the cuspidor bowl, these parts being adapted for operation individually in alternation so that but one is in use at a time and the direct supply of water cut off when the ejector is in operation, thereby conserving the quantity of water necessary for flushing the cuspidor. For the purpose of preventing the outward flow of water through the ejector connection, nipple 82 has formed in its inner end a valve seat 86 with which cooperates a check valve 87 which opens automatically during the use of the ejector.

The valve body 59 for selectively operating either the direct supply of water for the cuspidor or the ejector, and the valve 56ª are operated by a single valve spindle 88 rotatably and slidably supported in chamber 55. Valve 56ª is fixed on the inner end of the spindle, as shown, so that longitudinal sliding movement of the latter moves this valve toward and from its seat for the purpose described. The spindle has fixed thereon also a hub 89 carrying a finger 90 engaging in the recess 60 of valve body 59 for shifting the latter as described by rotation of the spindle. Means are also provided for urging the latter toward one or the other of its extreme positions of rotation with the valve body against one or the other of its seats comprising a shoulder 91 on the hub cooperating with a spring pressed plunger 92 carried by a plug 93 screwed into the head.

The valve spindle 88 is rotatably supported in the head by means comprising preferably a gland cup 94 in which the spindle rotates and which has a shoulder 95 bearing on an internal shoulder 96 in chamber 55. The gland cup is held in position by means of a sleeve 97 threadedly engaged in the externally opening end of chamber 55 and bearing against the shoulder 95 of the cup. Sleeve 97 supports a tubular part 98 rotating therein and on the spindle. Part 98 bears at its inner end on the outer end of the gland cup and is held against longitudinal movement by interengaging shoulders on the part and on sleeve 99. Part 98 is thus free to rotate but has no longitudinal movement and its inner end carries a lug 100 slidably engaging a longitudinal shoulder 101 on a sleeve 102 threadedly engaged in the outer end of the gland cup. Sleeve 102 bears at its other end against a beveled washer 103 for compressing the packing 104 and it is apparent from this construction that part 98 may be conveniently rotated when necessary for rendering the bearing of the spindle thoroughly water tight.

The outer end of part 98 is internally enlarged and threaded to receive a threaded sleeve 105 rotatably carried between a shoulder 106 on the spindle and a washer 107 secured to the outer end of the latter and the sleeve carries a finger piece or wing 108 by means of which it may be continuously rotated to thereby shift the spindle longitudinally independently of any rotary motion of the same for operating valve 56ª. Nut 107 carries a finger piece or wing 109 by means of which the spindle may be rotated independently of longitudinal motion thereof for shifting valve body 59. Spindle 88 thus affords a single device having one movement in a longitudinal direction for controlling the supply of water to the cuspidor nozzle and to the ejector simultaneously and having another or rotary movement for controlling the supply of water to these parts selectively and individually.

The nozzle extensions 65 and 85 for discharging water into the cuspidor directly or through the ejector respectively, are each provided with nozzle tubes 110 and 111 respectively, Fig. 2, curved into parallelism with each other and over the cuspidor side and united in a joint 112 carrying a common discharge nozzle 113 positioned above the beginning of the conducting and distributing waterway in the bowl. These nozzle tubes 110 and 111 are connected with their respective head extensions 65 and 85 by insertion of the lower ends thereof in the head extensions as shown in Fig. 7. A gland nut 114 containing packing 115 is provided for making these joints water tight. These valve head extensions are also utilized, together with the extension for the glass holder nozzle hereafter described, for detachably securing the head to arm 25. To this end each extension is formed below the threaded extremity thereof with a shoulder 116, Fig. 7 carrying a washer 117 for engagement with the underside of the horizontal portion 33 of the arm and a nut 118 threadedly engaged with the extension securely clamps the same and the head to the arm. As shown nut 118 is recessed at its upper end to avoid interference with gland nut 114.

Figures 12, 15:
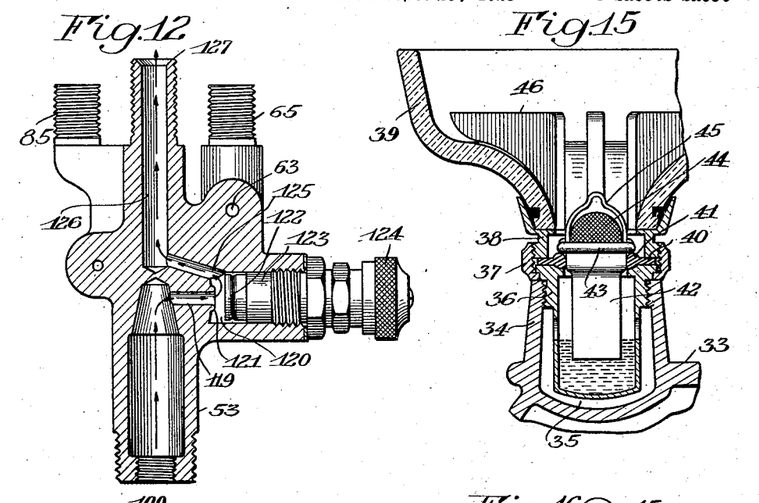
Fig. 12 is a sectional view substantially on the line $12^a$—$12^a$ in Fig. 5.
Fig. 15 is an enlarged central sectional view through the glass holder.
Figures 13, 14:
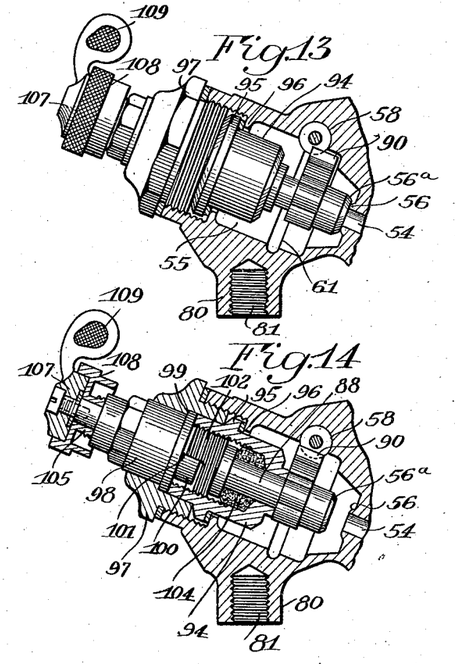
Figs. 13 and 14 are fragmentary sectional views of parts shown in Fig. 6, but in different positions.
Figure 16:
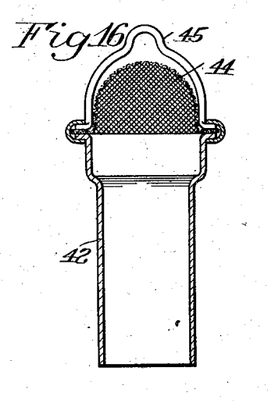
Fig 16 is an enlarged sectional view of a discharge spout and a screen for the glass holder.

The supply of water for the glass holder nozzle 47 is conducted from the supply connection 53 of the head, Fig. 12, through a lateral passage 119 into a chamber 120 in which it terminates with a valve seat 121. Cooperating with the latter is a valve 22 operated by a spindle 23 threadedly engaged with the walls of the valve chamber and operated by a fingerpiece or knob 124. Communicating laterally with chamber 120 is a passage 125 leading into a vertical passage 126 extending through the head and a threaded nozzle extension 127 clamped to arm 125 and connected with the glass nozzle 47 as described above in connection with the nozzles for the cuspidor.

The supply connection for the valve head is connected by a union coupling 128 with a curved length of pipe 129 rotatably connected at its other end as by a union 130 with the outlet 131 of a valve 132 carried by arm 20 and connected interiorly of the latter with a water supply line compactly housed therein. The valve outlet 131 is located concentrically with the vertical axis of the cuspidor bowl and of arm 25 so that the latter with the parts carried thereby may be rotated about the cuspidor to the most convenient position, the cuspidor bowl being simultaneously adjusted to position its waterway as described with relation to the discharge nozzle 113.

As shown in Figs. 3 and 4, arm 25 is formed with a circuitous portion 133 extending around the valve head at one side of the latter to provide for its attachment to the arm in central relation. This circuitous arm portion, and the table portion 33, are utilized together with wall extension portion 134 on the arm and supporting the table to form a housing compactly enclosing, protecting and concealing the valve head. A portion 135 of this housing is constructed as a detachable cover plate secured as by means of screws 136 to the valve head, with suitable apertures for the head extensions 53 and 80 and the valve operating spindles.

As apparent from the above description the fixture arm 25 may be swung on the main arm or support 20 to any convenient position and the cuspidor bowl adjusted to bring its distributing waterway under the discharge nozzle. By rotating fingerpiece 108 spindle 88 may be shifted longitudinally to admit water for either flushing the cuspidor bowl directly or operating the saliva ejector. By turning fingerpiece 109 in one direction the bowl may be flushed with a direct supply of water and whenever it is desired to use the ejector, the fingerpiece may be swung in the opposite direction thereby automatically cutting off the direct supply of water to the bowl and utilizing instead the discharge from the ejector to conserve the quantity of water necessary for flushing the bowl. The latter is correspondingly devised for flushing with a minimum quantity of water by the efficient means described for conducting the water about the circumference of the bowl and at the same time distributing it over the bottom in a continuous film. The drinking glass is effectively protected by the adjustable splash guard described as obviously desirable from a sanitary point of view. The water supply system for the different parts is conveniently controlled by but two operating devices on a unitary head detachably carried on the fixture and these and the various other advantageous features described are embodied in a simple, compact and convenient apparatus which furthermore has a simplicity of outline and arrangement affording a pleasing appearance.

I claim as my invention:

1. In a dental cuspidor fixture, the combination of a hollow support forming a waste conduit, a cuspidor discharging into said support, an arm on said support carrying a housing, a valve head enclosed and detachably secured in said housing, water supply means for the valve head, saliva ejector means controlled by the valve head and discharging into the cuspidor to flush the same, and water discharge means connected with the valve head for flushing the cuspidor.

2. In a dental cuspidor fixture, the combination of a hollow support forming a waste conduit, a cuspidor discharging into said support, a hollow arm on and discharging into said support and carrying a housing, a compact, unitary valve head enclosed and detachably secured in said housing, a glass holder above the housing on the arm and discharging into the latter, water supply means for the valve head, water discharge means for the glass connected with the valve head, saliva ejector means controlled by the valve head and discharging into the cuspidor to flush the same, and water discharge means connected with the valve head for flushing the cuspidor.

3. In a dental cuspidor fixture, the combination of a hollow support forming a waste conduit, a cuspidor discharging into said support, an arm having a pivotal movement on the support about the cuspidor, a housing on said arm, a glass holder on the arm provided with a filling nozzle, a nozzle for flushing the cuspidor, saliva ejecting means discharging into the cuspidor to flush the same, and a single valve means detachably secured in said housing for operating said flushing nozzle and ejecting means in alternation with each other.

4. In a dental cuspidor fixture, the combination of a hollow support forming a waste conduit, a cuspidor discharging into said support, a hollow arm having a pivotal movement on the support about the cuspidor center and discharging into the support, a housing on said arm, a valve head enclosed and detachably secured in the housing, a glass holder above the housing on the arm and discharging into the latter, water supply means for the valve head, water discharge means connected with the valve head for filling the glass and flushing the cuspidor and saliva ejector means controlled by the valve head and discharging into the cuspidor to flush the same.

5. In a dental cuspidor fixture, the combination of a hollow support forming a waste conduit, a cuspidor discharging into said support, a hollow arm discharging into and projecting upwardly and outwardly from the support and formed adjacent the periphery of the cuspidor with a laterally circuitous portion and housing, a compact, unitary valve head detachably secured and enclosed in said circuitous portion and housing, a glass holder on and discharging into said arm above said portion thereof, water supply means for said head, outlet connections with the valve head for filling the glass and flushing the cuspidor, and a saliva ejector controlled by said valve head and discharging into the cuspidor to flush the same.

6. In a dental cuspidor fixture, the combination of a hollow support forming a waste conduit, a cuspidor discharging into said support, a hollow arm discharging into and projecting upwardly and outwardly from the support adjacent the periphery of the cuspidor, a valve head on the arm adjacent the latter, said arm being curved laterally about said head and formed with a housing including a detachable cover for enclosing said head, a glass holder on and discharging into the arm above said curved portion thereof, water supply means for said head, outlet connections with said head for the glass and for flushing said bowl, and a saliva ejector controlled by said head.

7. In a dental cuspidor fixture, the combination with a cuspidor, of means for flushing the same, a saliva ejector and a single control device for operating said means and ejector in alternation.

8. In a dental cuspidor fixture, the combination with a cuspidor, of means for flushing the same, a saliva ejector arranged to discharge into and flush the cuspidor, and a single control device for operating said means and ejector in alternation.

9. In a dental cuspidor fixture the combination with a fountain cuspidor, of a single nozzle arranged to flush the same, water supply means connected with said nozzle, saliva ejecting means connected with said nozzle, and a control device common to said means for selectively causing the operation of either of said means and discontinuing the operation of the other.

10. In a fountain cuspidor fixture, the combination with a cuspidor bowl having a waste outlet and a waterway extending around the bowl and inclined in the direction of extent for producing a spiral flow of water over the bowl and into said outlet, water supply means discharging into said waterway, saliva ejecting means, and a control device common to said means for selectively causing the operation of either of said means and discontinuing the operation of the other.

11. In a dental cuspidor fixture, the combination with a cuspidor bowl having a peripherally extending waterway inclined downwardly in the direction of extent and arranged for distributive overflow of water therefrom for flushing said bowl, of water supply means and saliva ejecting means discharging into said waterway at the upper portion thereof, and a control device common to said means for selectively causing the operation of either of said means and discontinuing the operation of the other.

12. In a dental cuspidor fixture, the combination with a cuspidor bowl having a central waste outlet and a peripherally extending, downwardly inclined waterway arranged for distributive overflow of water therefrom for flushing said bowl, of water supply means and saliva ejecting means discharging into the upper end of said waterway, and a control device common to said means for selectively causing the operation of either of said means and discontinuing the operation of the other.

13. A fountain cuspidor bowl having a waterway extending around the same and inclined in the direction of extent for producing a spiral flow of water over the bowl to flush the same.

14. A fountain cuspidor bowl having its bottom inclined downwardly to a central waste outlet and a peripherally extending waterway inclined in the direction of extent to conduct water from a source of supply around the bowl periphery and to distribute the same by overflow over the bowl bottom to flush the same.

15. A fountain cuspidor bowl having peripherally extending, longitudinally inclined water carrying means adapted to conduct the water about the bowl and to produce an overflow of the water laterally to distribute the same in a film over the bowl bottom.

16. A fountain cuspidor bowl having a longitudinally inclined water conducting channel extending about its periphery and arranged to cause the overflow of water laterally onto the bowl wall for distributing the same thereover and flushing the bowl.

17. A circular fountain cuspidor bowl having a longitudinally inclined water conducting channel of progressively decreasing depth extending about the circumference thereof and adapted to cause an overflow of water laterally onto the bowl wall for distributing the same thereover and flushing the bowl.

18. A circular fountain cuspidor bowl having its bottom inclined downwardly to discharge water through a central waste outlet and having a water conducting channel of progressively decreasing depth extending about the bowl circumference above its bottom and adapted to cause an overflow of water laterally throughout its length to distribute the same in a continuous film over the bowl bottom to flush the same.

19. In a dental cuspidor fixture, the combination with a hollow support, a cuspidor bowl having a central waste outlet into the support and a peripherally extending, longitudinally inclined waterway adapted to conduct the water about the bowl and to produce an overflow thereof laterally to distribute the same in a film over the bowl bottom, an arm on said support, a valve head detachably carried by said arm and adapted for connection with a source of supply of water, water conducting means and saliva ejecting means connected with said head and discharging into said waterway, and a single valve device on said head for selectively causing operation of either of said means and discontinuing operation of the other.

20. In a dental cuspidor fixture, the combination with a support, a cuspidor thereon, a glass holder thereon at one side of said cuspidor, and a guard on the holder extending partially around and overhanging the glass between the latter and said cuspidor to guard said glass from contamination by splashing from said cuspidor to overhang the glass between the latter and said cuspidor.

21. In a dental cuspidor fixture, the combination with a support, a cuspidor thereon, a glass holder thereon at one side of said cuspidor provided with an upwardly extending nozzle, and a guard for the glass supported by said nozzle between said holder and cuspidor.

22. In a dental cuspidor fixture, the combination with a support, a cuspidor thereon, a glass holder thereon at one side of said cuspidor provided with an upwardly extending nozzle, and a guard for the glass resting at its bottom on said holder and supported by said nozzle between said holder and cuspidor.

23. In a dental cuspidor fixture, the combination with a support, a cuspidor thereon, a glass holder thereon at one side of said cuspidor provided with an upwardly extending nozzle, a guard having a bottom portion formed with a seat adapted to rest on the holder rim and a top portion curved to overhang the glass between the latter and said cuspidor and bracket means connecting the nozzle and guard for supporting the latter in position.

24. In a dental cuspidor fixture, the combination with a hollow support having an upwardly opening end provided with a trap discharging thereinto, a glass holder mounted on said support, a discharge spout for said holder provided with a shouldered upper end and with a screen, and a gasket clamped and secured to the joint between said holder and support and having an inwardly projecting portion frictionally embracing said spout below said shouldered end and detachably securing the same in position with its lower end depending into said trap.

25. In a dental cuspidor fixture, the combination of a support, a cuspidor thereon, a valve head on said support provided with a water supply connection, water discharge means connected with said head and discharging into the cuspidor to flush the same, saliva ejecting means on said head, valve means in said head controlling said discharge and ejecting means, and a single manipulative device for actuating said valve means to selectively cause the operation of either of said discharge and ejecting means and discontinue the operation of the other.

26. In a dental cuspidor fixture, the combination of a support, a cuspidor thereon, a glass holder thereon, a valve head on said support, a nozzle for the glass connected with said head, a nozzle for flushing the cuspidor connected with said head, saliva ejecting means on said head, valve means controlling said glass nozzle and valve means common to said cuspidor nozzle and ejecting means for selectively causing the operation of either thereof and discontinuing the operation of the other.

27. In a dental cuspidor fixture the combination of a support, a cuspidor thereon, a valve head on said support having a water supply connection, a nozzle connected with said head for flushing the cuspidor, a saliva ejector on said head, valve means controlling said supply connection, a second valve means for selectively causing the operation of either said cuspidor nozzle or ejector in alternation, and a single valve spindle having one movement for actuating said first valve means and another movement for actuating said second valve means.

ALPHONSE F. PIEPER.